US007485685B2

(12) United States Patent
Mihan et al.

(10) Patent No.: US 7,485,685 B2
(45) Date of Patent: Feb. 3, 2009

(54) PLASTICS PIPES OF POLYOLEFINS

(75) Inventors: Shahram Mihan, Bad Soden (DE); Heinz Vogt, Frankfurt (DE); Ilka Beuermann, Pulheim-Sinthern (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 11/551,121

(22) Filed: Oct. 19, 2006

(65) Prior Publication Data

US 2007/0065613 A1 Mar. 22, 2007

Related U.S. Application Data

(63) Continuation of application No. 10/496,079, filed as application No. PCT/EP02/12964 on Nov. 20, 2002, now abandoned.

(30) Foreign Application Priority Data

Nov. 23, 2001 (DE) ................................. 10157369

(51) Int. Cl.

| | |
|---|---|
| ***C08F 4/24*** | (2006.01) |
| ***C08F 4/02*** | (2006.01) |
| ***C08F 110/02*** | (2006.01) |
| ***C08F 210/16*** | (2006.01) |
| ***B29C 47/00*** | (2006.01) |

(52) U.S. Cl. ....................... 526/106; 526/130; 526/352; 526/348; 264/464; 264/472; 264/476; 264/477; 264/563

(58) Field of Classification Search ................. 526/106, 526/130, 348, 352; 264/464, 472, 476, 477, 264/563
See application file for complete search history.

(56) References Cited

U.S. PATENT DOCUMENTS

| | | | |
|---|---|---|---|
| 2,993,883 A | 7/1961 | Lyons | |
| 3,130,188 A | 4/1964 | Hogan | |
| 3,872,217 A | 3/1975 | Merz et al. | |
| 4,037,042 A | 7/1977 | Mueller-Tamm | |
| 6,376,595 B1 | 4/2002 | Palmlof | |
| 6,423,792 B1 | 7/2002 | Debras et al. | |
| 6,525,148 B1 | 2/2003 | McDaniel et al. | |
| 6,608,151 B1 * | 8/2003 | de Lange et al. | 526/106 |
| 6,897,181 B2 | 5/2005 | Mihan et al. | |

FOREIGN PATENT DOCUMENTS

| | | |
|---|---|---|
| DE | 2 103 243 | 8/1972 |
| DE | 25 40 279 | 3/1977 |
| EP | 1 041 089 A1 | 10/2000 |
| EP | 1 046 655 A1 | 10/2000 |
| EP | 1 046 656 A1 | 10/2000 |
| GB | 1 550 951 | 8/1979 |
| WO | WO 99/57193 | 11/1999 |
| WO | WO 01/17675 * | 3/2001 |
| WO | WO 01/90204 | 11/2001 |
| WO | WO 03/044063 A1 * | 5/2003 |

* cited by examiner

*Primary Examiner*—Roberto Rábago
(74) *Attorney, Agent, or Firm*—Novak Druce + Quigg LLP

(57) ABSTRACT

Plastics pipes comprise polyolefins which can be prepared by means of a fluorine-modified chromium catalyst and are used for transporting gases and liquids.

13 Claims, No Drawings

PLASTICS PIPES OF POLYOLEFINS

This is a continuation application of application Ser. No. 10/496,079, now abandoned which is a national stage application filed under 35 USC 371 based on international application No. PCT/EP02/12964 filed on Nov. 20, 2002, which is herewith incorporated by reference.

The present invention relates to plastics pipes which are produced using special polyolefins and to the use of said pipes.

Polyethylene is used in large quantities for the production of pipes, for example for gas and water transport systems, because a material having high mechanical strength, high corrosion resistance and good long-term stability is required for such pipes. Numerous publications describe materials having a very wide range of properties and processes for their preparation.

Suitable polymers for the production of plastics pipes are described, for example, in DE-A1-2540279 and are prepared by means of a chromium catalyst. However, high processing speeds during the extrusion lead to an increase in the roughness on the inside of the pipes.

Plastics pipes having particularly high creep rupture strength, impact resistance and heat distortion resistance are obtained from polyethylene having a high density and high molar masses, which is also subsequently crosslinked. The polyethylene described in DE-A1-2540279 is also suitable for this purpose. However, the crosslinking yields are still too low. In order to achieve high degrees of crosslinking, longer crosslinking times are therefore necessary, which leads to a slowing down of the manufacturing process and higher costs.

U.S. Pat. No. 3,130,188 discloses that silica gel-supported chromium oxide catalysts modified with inorganic fluorides, for example ammonium hexafluorosilicate, have high polymerization activity, and the polyethylene obtained has a narrow molecular weight distribution. A narrow molecular weight distribution, however, often leads to poorer processibility.

It is known that the polymer properties of polyolefins can be changed and determined within wide ranges by the type and structure of the polymerization catalyst used and the support material used. The composition of the catalyst support and of the catalytically active material thereon, its structure and the activation conditions have a decisive effect on the performance of the catalyst in the polymerization process, the activity of the catalyst and the structure and the properties of the resulting polymer. Very small changes in the composition or structure of both the catalytically active material and the support material therefore often lead to surprising effects.

It is an object of the present invention to provide plastics pipes using novel polyolefins which can be extruded at high processing speeds and overcome the abovementioned disadvantages of the prior art. During crosslinking, the plastics pipes should moreover exhibit high crosslinking yields.

We have found that this object is achieved by plastics pipes comprising a polyolefin which can be prepared by means of a fluorine-modified chromium catalyst and their use for transporting gases and liquids.

We have furthermore found crosslinked plastics pipes, wherein the novel plastics pipes are crosslinked, and their use for transporting gases and liquids.

Surprisingly, it has been found that, by using fluorine-modified chromium catalysts of the Phillips type, it is possible to prepare polyolefins whose property profile is ideal for use in plastics pipes. It has been found that, using fluorine-modified chromium catalysts, it is possible to prepare polyolefins which have a balanced ratio of processibility to mechanical properties. Polymers are obtained which are readily processible to give plastics pipes, said pipes having a smooth inner surface. This is particularly surprising since these properties are usually exactly the opposite. These unusual properties of polyolefins prepared by means of fluorine-modified chromium catalysts can be particularly advantageously used in the production of novel plastics pipes.

The polyolefins for use in novel plastics pipes are prepared using a fluorine-modified chromium catalyst, in particular a fluorine-modified heterogeneous chromium catalyst. For this purpose, catalysts known in the prior art are fluorine-modified by means of suitable fluorinating agents. Conventional chromium containing polymerization catalysts which contain silica gel or modified silica gel as support material and chromium as catalytically active component have long been part of the prior art as so-called Phillips catalysts in the preparation of polyethylene. Phillips catalysts are activated before the polymerization, as a rule at high temperatures, in order to stabilize chromium on the catalyst surface as chromium (VI) species. This species is reduced by adding ethylene or reducing agents in order to form the catalytically active chromium species.

Suitable catalysts for the preparation of the polyolefins for use in novel plastics pipes are in particular silica gel-supported chromium catalysts which are activated with air and are modified with an inorganic fluorinating agent. Particularly suitable as support materials for these catalysts are spherical support materials based on silica hydrogels having a relatively high solids content of from 10 to 25% (calculated as $SiO_2$). These support materials are subsequently loaded with one or more chromium compounds and activated in an anhydrous 10% strength by volume oxygen stream at from 400 to 1100° C.

The preparation of suitable catalysts is described, for example, in DE 25 40 279 and is hereby incorporated by reference, the additionally required fluoride doping being carried out alternatively in the preparation of catalyst intermediates (i.e. during the impregnating step) or during the activation step in the activator, for example by coimpregnation of the support with a solution of the fluorinating agent and the desired chromium compound, or by adding fluorinating agents in the gas stream during the air activation.

Particularly suitable catalysts are those which can be prepared by a process which comprises the following steps:

a) Preparation of a finely divided silica xerogel by
  - a1) use of a particulate silica hydrogel which contains from 10 to 25% by weight of solid (calculated as $SiO_2$), is substantially spherical, has a particle diameter of from 1 to 8 mm and is obtained by
    - a11) introduction of a sodium or potassium waterglass solution into a vortex stream of an aqueous mineral acid and both longitudinally and tangentially with respect to the stream,
    - a12) spraying of droplets of the resulting silica hydrosol into a gaseous medium,
    - a13) allowing the sprayed hydrosol to solidify in the gaseous medium and
    - a14) freeing of the resulting substantially spherical particles of the hydrogel from salts without prior aging by washing,
  - a2) extraction of at least 60% of the water contained in the hydrogel by means of an organic liquid,
  - a3) drying of the resulting gel at 180° C. and a reduced pressure of 13 mbar for 30 minutes until weight loss no longer occurs (xerogel formation) and a4) adjustment of the particle diameter of the xerogel obtained to 20 to 2000 μm, b) loading of the xerogel with chromium from a solution of chromium trioxide or of chromium compound which is converted into chromium trioxide under the conditions of stage c) and c) activation of the resulting product in an anhydrous gas stream, containing oxygen in a concentration of more than 10% by volume, at from 400 to 1100° C.

The preparation of the catalyst support and the application of the chromium are carried out here as described in DE-A 25 40 279.

Stage a

It is essential for a first step comprising the preparation of the support material to use a silica hydrogel which has a relatively high solids content of from 10 to 25, preferably from 12 to 20, particularly preferably from 14 to 20, % by weight (calculated as $SiO_2$) and is substantially spherical. This silica hydrogel was prepared in a special manner which is described in stages a11) to a14). Stages a11) to a13) are described in more detail in DE-A 21 03 243. Stage a14), the washing of the hydrogel, can be carried out as desired, for example according to the countercurrent principle with weakly ammoniacal (pH up to about 10) water having a temperature up to 80° C.

The extraction of the water from the hydrogel (stage a2)) is preferably carried out using an organic liquid which is particularly preferably water-miscible, from the series consisting of $C_1$- to $C_4$-alcohols and/or the $C_3$- to $C_5$-ketones. Particularly preferred alcohols are tert-butanol, 2-propanol, ethanol and methanol. From the series consisting of the ketones, acetone is preferred. The organic liquid may also consist of mixtures of the abovementioned organic liquid, in each case the organic liquid containing less than 5, preferably less than 3, % by weight of water before the extraction. The extraction can, be carried out in conventional extraction apparatuses, e.g. column extractors.

The drying (stage a3)) is preferably effected at from 30 to 140° C., particularly preferably from 80 to 110° C., and preferably from 1.3 mbar to atmospheric pressure. For reasons relating to the vapor pressure, an increasing pressure should also be associated with an increase in temperature, and vice versa.

The adjustment of the particle diameter of the hydrogel obtained (stage a4)) can be carried out as desired, for example by milling and sieving.

Stage b

The application of the chromium trioxide to the xerogel is preferably carried out from a 0.05 to 5% strength by weight solution of chromium trioxide in a $C_3$- to $C_5$-ketone or from a 0.05 to 15% strength by weight solution of chromium compound which can be converted into chromium trioxide under the conditions of stage c), in a $C_1$- to $C_4$-alcohol, the respective solvent not being permitted to contain more than 20% by weight of water. The xerogel is suspended in the solution of the corresponding chromium compound and the liquid components of the reaction mixture are evaporated with continuous, very homogeneous, thorough mixing. The residual mixture content of the xerogel laden with the chromium component should be not more than 20, preferably not more than 10, % by weight, based on the xerogel, of volatile-components, the content of organic solvents being included in said residual moisture content.

Suitable chromium components in addition to chromium trioxide and a chromium hydroxide are soluble salts of trivalent chromium with an organic or inorganic acid, such as acetates, oxalates, sulfates and nitrates. Particularly preferably used salts are those which are completely converted into chromium (VI) on activation, such as chromium (III) nitrate nonahydrate.

The catalyst obtained in stage b) has a chromium content of, in general, from 0.05 to 5, preferably from 0.1 to 1.5, particularly preferably from 0.2 to 1, by weight, based on the total mass of the catalyst.

Stage c

The activation of the catalyst can be carried out in a conventional manner, and the conditions should be chosen so that the chromium in the prepared catalyst is present substantially in the hexavalent state (Cr(VI)).

The activation is preferably effected in a gas stream containing anhydrous oxygen in a concentration of more than 10% by volume, e.g. in air, at from 400 to 1100° C., preferably from 500 to 800° C., particularly preferably from 600 to 700° C.

Fluoride Doping

The doping with fluoride can be carried out in stage a), in stage b) or in stage c). In a preferred embodiment, the doping is carried out in stage b), a fluorinating agent being applied together with the desired chromium component, for example by coimpregnation of the support with a solution of the fluorinating agent and of the desired chromium compound.

In a further preferred embodiment of the catalyst for the preparation of suitable polyolefins, the doping with fluorine is carried out after the application of the chromium during the activation in stage c) of the novel process. The fluoride doping is particularly preferably carried out together with the activation at from 400 to 900° C. in air. A suitable apparatus for this purpose is, for example, a fluidized-bed activator.

Suitable fluorinating agents for doping supported chromium catalysts are all conventional fluorinating agents, such as $ClF_3$, $BrF_3$, $BrF_5$, ammonium hexafluorosilicate ($NH_4SiF_6$), ammonium tetrafluoroborate ($NH_4BF_4$), ammonium hexafluoroaluminate ($NH_4AlF_6$), $NH_4HF_2$, ammonium hexafluoroplatinate ($NH_4PtF_6$), ammonium hexafluorotitanate ($NH_4TiF_6$), ammonium hexafluorozirconate ($NH_4ZrF_6$), and the like. Fluorinating agents selected from the group consisting of $(NH_4)_2SiF_6$, $NH_4BF_4$, $(NH_4)_2AlF_6$, $NH_4HF_2$ and $(NH_4)_3PF_6$ are particularly suitable. $(NH_4)_2SiF_6$ is particularly preferably used. Supported chromium catalysts doped with ammonium hexafluorosilicate are particularly preferred.

The fluorinating agent is used in general in an amount of from 0.5 to 10, preferably from 0.5 to 8, particularly preferably from 1 to 5, very particularly preferably from 1 to 3, % by weight, based on the total mass of the catalyst used. Depending on the amount of fluoride in the catalyst, the properties of the polymers prepared may also be varied.

The preparation of polyolefins which can be used according to the invention by means of fluorine-modified chromium catalysts is carried out by the conventional polymerization processes of the prior art, for example by suspension polymerization or by dry-phase polymerization, stirred gas-phase polymerization, gas-phase fluidized-bed polymerization or solution polymerization. These processes can be carried out both in single-line plants and in reactor cascade plants.

The polyolefins used according to the invention are homo- or copolymers of alkenes, in particular $C_2$-$C_{10}$-alkenes, for example ethene, propene, 1-butene, 1-pentene, 1-hexene, 1-heptene, 1-octene, 1-nonene and 1-decene. Particularly suitable polyolefins for the production of the plastics pipes are homo- and copolymers of ethylene, suitable comonomers being $C_2$-$C_{10}$-alkenes. Copolymers of ethylene with 1-alkenes of 3 to 10 carbon atoms, for example propene, 1-butene, 1-pentene, 1-hexene or 1-octene, give particularly advantageous polyolefins. Particularly preferred polyolefins are copolymers of ethylene with 1-butene or 1-hexene.

The polyolefin and in particular the ethylene homo- and copolymers preferably have a density of from 0.943 to 0.955, preferably from 0.945 to 0.954, in particular from 0.946 to 0.952, g/cm$^2$, a melt flow rate HLMI (190° C./21.6 kg) of from 4 to 12, preferably from 5 to 11, in particular from 7 to 10, g/10 min and a molar mass distribution Mw/Mn of from 8 to 18 preferably from 9 to 17, in particular from 11 to 16.

The novel plastics pipe may also contain further additives in addition to the polyolefin. Such additives are, for example, heat stabilizers, antioxidants, UV absorbers, light stabilizers, metal deactivators, peroxide-destroying compounds, basic costabilizers in amounts of from 0 to 10, preferably from 0 to 5, % by weight, and also fillers, reinforcing agents, plasticizers, lubricants, enulsifiers, pigments, optical brighteners, flameproofing agents, antistatic agents, blowing agents or combinations of these in total amounts of from 0 to 50% by weight, based on the polyolefin.

The novel plastics pipe is produced from the polyolefin by first plastifying the polyolefin in an extruder at from 200 to 250° C. and then forcing it out through an annular die and cooling it. For processing to give pipes, both conventional single-screw extruders having a smooth feed zone and high-performance extruders having finely grooved cylinders and a conveying feed can be used. The screws are typically designed as decompression screws having a length of from 25 to 30 times their diameter. The decompression screws have a discharge zone in which temperature differences in the melt are compensated and in which the relaxation stresses formed by shearing should be eliminated.

The melt arriving from the extruder is first distributed over an annular cross-section via conically arranged holes and then fed via a helical distributor or a screen to the core/die combination. If required, die restrictor rings or other construction elements may additionally be installed before the die outlet for equalizing the melt flow.

Up to large pipe diameters the gaging and cooling are expediently carried out by gaging under reduced pressure. The actual shape is carried out using cut pipe formers which are produced from nonferrous metal for beat removal. A water film fed in in the inflow ensures rapid cooling of the surface of the pipe below the crystallite melting point and additionally serves as a lubricating film for reducing the frictional forces. The total length L of the cooling zone is based on the assumption that a melt having a temperature of 220° C. is to be cooled with the aid of water at from 15 to 20° C. until the temperature of the inner surface of the pipe is not more than 85° C.

Plastic pipes having a diameter of from 5 to 150 mm and a wall thickness of from 0.5 to 15 mm can thus be produced.

Polyolefins prepared using fluorine-modified chromium catalysts have a balanced property profile. Polyolefins, in particular ethylene homo- and copolymers, prepared with the use of fluorine-doped chromium catalysts are outstandingly processible in spite of a low flow rate. Analogously prepared ethylene copolymers have a narrower molecular weight distribution than ethylene copolymers prepared using undoped catalysts, said molecular weight distribution surprisingly not affecting the processing properties of the material.

The novel plastics pipes are very suitable for transporting gases and liquids.

In some applications involving pipes, such as pipelines for hot water distribution or underfloor heating, temperatures of from 70 to 90° C. occur during use. In order to withstand these high temperatures, the novel plastics pipes are crosslinked, in particular radiation-crosslinked, during or after the extrusion.

The crosslinking of polyolefins, in particular ethylene homo- and copolymers, is carried out during or after the pipe extrusion. In the crosslinking processes, the polymer chains ate linked with one another by chemical bonds (crosslinking). This improves the creep rupture strength, the stress cracking resistance and the heat distortion resistance and the abrasion resistance of the pipes.

An important quality criterion for crosslinked pipes is the degree of crosslinking. It serves as a measure for the proportion of crosslinked polyolefin chains in the crosslinked polyolefin. DIN 16892 gives minimum values for the various crosslinking processes. These minimum values are necessary for ensuring that the pipes containing crosslinked polyolefins, in particular crosslinked ethylene homo- and copolymers, have the required properties. The smaller the distance between two crosslinking points, i.e. the smaller the meshes of the network, the greater is the crosslinking density.

The crosslinking can be carried out, for example, with peroxides completely or partly in the melt, or with silanes or radiation. Conventional peroxide crosslinking processes are, for example, the Engel process, the crosslinking being effected during the shaping process, or the extrusion process, the crosslinking itself generally being effected in a downstream process, for example the extruded pipes being crosslinked in a heat chamber or in a heated salt bath or by means of IR radiation. Conventional crosslinking processes with silanes are the so-called one-stage process, for example the Monosil® process from Nextron, in which the grafting of the silane and the extrusion of the pipe take place in a single process step, and the so-called two-stage process, also referred to as the Sioplas process according to Dow Corning, in which the silane is grafted onto the polymer in the first step and the actual pipe extrusion is then carried out in a separate second step. In both processes, the actual crosslinking is then effected in a downstream process in the presence of water by the reaction of the silanes to give Si-O-Si bridges.

The radiation crosslinking is a physical crosslinking method. Chemical additives are not required. High-energy radiation (electron (β) radiation) cleaves the carbon-hydrogen bonds, and free radical sites are formed in the polymer chain. The recombination of free radical sites from different chains leads to the desired chain linkage. In radiation crosslinking, extrusion and crosslinking take place in two spatially separate steps at different times. For this reason, the extrusion can be carried out on conventional extrusion apparatuses. For the crosslinking, the plastics pipe passes at high speed several times through the irradiation window of the electron accelerator. In order to achieve the required degree of crosslinking of >60%, as a rule a radiation dose of 130-150 kGy is required (Gray: 1 kGy=1 kJ/kg=0.1 Mrad (old unit)). For building installation pipes (diameter: from 10 to 35 mm, wall thickness: from 1.2 to 3 mm), conventional acceleration voltages are from 1.5 to 5 (10) MeV.

Novel plastics pipes and crosslinked plastics pipes can be used for a large number of applications, in particular for transporting gases, preferably natural gas or steam, and liquids, preferably water, and are thus particularly suitable as heating pipes.

The invention is explained in more detail with reference to the following examples which are not intended to be limiting. In the examples, it is shown in particular that plastics pipes having particularly good processibility can be produced from materials which are prepared using fluorine-modified chromium catalysts.

EXAMPLES AND COMPARATIVE EXPERIMENTS

Example 1

A mixing nozzle shown in the figure in DE-A 2 103 243 having the following data is used: the diameter of the cylindrical mixing chamber formed from a plastics tube is 14 mm and the length of the mixing space (including downstream mixing zone) is 350 mm. A tangential inflow hole of 4 mm diameter for the mineral acid is provided close to the entry side of the mixing chamber, which side is closed at the end. Four further holes likewise having a diameter of 4 mm and the same inflow direction are connected for the waterglass solution, the distance between the holes, measured in the longitudinal direction of the mixing chamber, being 30 mm. Accordingly, the ratio of length to diameter of the primary mixing zone is about 10:1. For the downstream secondary mixing zone, this ratio is 15, A flattened, slightly kidney-shaped pipe section is pushed over the exit end of the plastics tube, as a spray mouthpiece.

This mixing apparatus is fed with 325 l/h of 33% strength by weight sulfuric acid having a temperature of 20° C. at an operating pressure of about 3 bar and 1100 l/h of waterglass solution (prepared from industrial waterglass containing 27% by weight of $SiO_2$ and 8% by weight of $Na_2O$ by dilution with water) having a density of 1.20 kg/l and a temperature of likewise 20° C. at a pressure of likewise about 3 bar. An unstable hydrosol having a pH of from 7 to 8 is formed in the mixing chamber lined with the plastics tube by progressive neutralization and remains in the downstream mixing zone for about a further 0.1 s until complete homogenization before it is sprayed through the nozzle mouthpiece as a fan-shaped liquid jet into the atmosphere. During the flight through the air, the jet divides into individual drops which, owing to the surface tension, are converted into a substantially spherical form and solidify during their flight in the course of about one second to give hydrogel spheres. The spheres have a smooth surface, are transparent, contain about 17% by weight of $SiO_2$ and have the following particle distribution

| | |
|---|---|
| >8 mm | 10% by weight |
| 6-8 mm | 45% by weight |
| 4-6 mm | 34% by weight |
| <4 mm | 11% by weight |

(The particle distribution can be varied as desired by using other nozzle mouthpieces.) The hydrogen spheres are collected at the end of their flight in a wash tower which is virtually completely filled with hydrogel spheres and in which the spheres are immediately washed salt-free, without aging, with weakly ammoniacal water having a temperature of about 50° C. in a continuous countercurrent process.

The spheres, which have a diameter of from 2 to 6 mm, are isolated by sieving and 112 kg of these spheres are introduced into an extraction drum having a feed at the top, a sieve bottom and a gooseneck overflow which is connected to the bottom of the drum and keeps the liquid level in the drum sufficiently high for the hydrogel spheres to be completely covered with liquid. Ethanol is then fed in at a rate of 60 l/h until the density of the ethanol/water mixture emerging at the overflow has decreased to 0.826 g/cm$^3$. About 95% of the water contained in the hydrogel have then been extracted.

The spheres obtained are then dried (12 hours at 120° C. under a reduced pressure of 20 mbar) until no more weight loss occurs at 180° C. under a reduced pressure of 13 mbar in the course of 30 minutes.

The dried spheres are then milled and the xerogel particles, which have a diameter of from 4.0 to 300 μm, are isolated by sieving.

The xerogel particles are treated with a 3.56% strength by weight solution of chromium nitrate ($Cr(NO_3)_3 \cdot 9H_2O$) in methanol for 5 seconds and freed from methanol under reduced pressure so that the catalyst intermediate obtained has a chromium content of 1% by weight, based on the total mass, of Cr.

The activation was effected at 650° C. with the addition of 2% by weight, based on the catalyst, of ammonium hexafluorosilicate in a fluidized-bed activator by means of air. For the activation, the catalyst intermediate is heated to 350° C. in the course of 1 hour, kept at this temperature for 1 hour then heated to the desired activation temperature, kept at this temperature for 2 hours and then cooled, cooling being effected at 350° C. under $N_2$.

Example 2 (Comparative Example)

The catalyst was prepared according to DE-A-2540279 and activated at 600° C. in a fluidized-bed activator with air. For the activation, the catalyst intermediate was heated to 350° C. in the course of 1 hour, kept at this temperature for 1 hour, then heated to the desired activation temperature, kept at this temperature for 2 hours and then cooled, cooling being effected at 350° C. under $N_2$.

Polymerization

The polymerizations were carried out in a 30 M$^2$ Phillips loop reactor in isobutane at 39 bar. The polymerization data are shown in table 1. In each case, an ethylene/hexene copolymer having a density of 0.947 g/cm$^3$ was obtained.

The polymer was then granulated in an extruder with Irganox 1076 (0.08 g/100 g of polymer), Naugard XL (0.18 g/100 g of polymer), Ethanox 330 (0.4 g/100 g of polymer) and vinyl acetate (0.45 g/100 g of polymer). These granules were processed in an extruder (ZSK 60/250) at 210° C. to give pipes having an internal diameter of 12 cm and an external diameter of 16 cm. The properties of the polymers and pipes are shown in table 2.

From the examples, it is clear that the polymer prepared using the chromium-modified catalyst is most suitable for processing to give pipes. In spite of a high molar mass and a relatively narrow molar mass distribution, it is readily processible. It has been found that the polymer from example 1 has in particular short sag times even at high temperatures. In contrast, the comparative polymer has very much longer sag times. It is noteworthy that, in spite of the very high line speeds, the ethylene copolymer from example 1 has a very smooth and glossy surface.

The product parameters shown in the tables were determined by the following methods of measurement:

Density: according to ISO 1183

HLMI: Melt flow index (190° C./21.6) according to ISO 1133

Eta value: Using an automatic Ubbelohde viscometer (Lauda PVS 1) with decalin as solvent at 130° C. (ISO1628 at 130° C., 0.001 g/ml of decalin)

The bulk density (BD) [g/l] was determined according to DIN 53468.

The molar mass distributions and the mean values Mn, Mw and Mw/Mn derived therefrom were determined by means of high-temperature gel permeation chromatography (GPC) based on DIN 55672 under the following conditions: solvent: 1,2,4-trichlorobenzene, flow rate: 1 ml/min, temperature: 140° C., calibration with PE standards.

The Rheotens measurement was carried out using a high-pressure plunger-type capillary viscometer (capillary length=240 mm, internal diameter=15 mm), measuring die (length=12.1 mm, diameter=1.33 mm) (wheel made of aluminum sheet (material thickness=2.1 mm, external wheel diameter=125.2 mm, width of the winding surface=20.1 mm, spacing of the guide slots=50 mm, thickness of the guide slots=1 mm)). The characterization of polymer melts with the aid of the Rheotens test gives important information with respect to the processibility of different polymer products.

For this purpose, a polymer strand is produced by means of a capillary viscometer at constant shear velocity ($v_0$) and extruded through a die (L/R=18). The strand is drawn onto the Rheotens wheel with a constant distance (die to wheel=90 mm) and taken off at a predetermined initial velocity (v=10 mm/s) and constant acceleration (a=10 mm/$s^2$). The resultant force F until the strand tears is determined.

(The two essential parameters for assessing the processibility are the maximum drawability $v_{max}/v_0$ and the melt strength, i.e. the force F when the strand tears.) By means of automatic evaluation using a crosshair, the measured parameters from ten individual measurements are stored in a table and evaluated using a computer.

The sag time was determined on the same apparatus on which the HLMI was measured, by exerting a force of 10 p on the emerging polymer strand and measuring the time which the strand requires for covering a distance of 20 cm at 210° C.

combining said polyolefin with further additives in an amount of from 0 to 10% by weight; and shaping said combination into the form of a pipe by means of melt extrusion.

2. A method according to claim 1 wherein the polyolefin thus prepared has a density of from 0.943 to 0.955 g/$cm^3$, a melt flow rate HLMI (190° C./21.6 kg) of from 4 to 12 g/10 minutes, and a molar mass distribution $M_w/M_n$ from 8 to 18.

3. A method according to claim 1 further comprising: crosslinking said polyolefin.

4. A method according to claim 3 wherein said polyolefin has a molar mass distribution $M_w/M_n$ from 8 to 18.

5. A method according to claim 1 wherein the catalyst employed in the preparation of the polyolefin is prepared by a process which comprises:

a) providing a finely divided silica xerogel;

b) loading the xerogel with chromium from a solution of chromium trioxide or of a chromium compound; and c) activating the product obtained in stage (b) in an anhydrous gas stream, containing oxygen in a concentration of more than 10% by volume at from 400 to 1,100° C.; and wherein the chromium compound is converted into chromium trioxide under the conditions of stage (c); and wherein the modification of the catalyst with the fluorinating agent is conducted in stage (a), in stage (b), or in stage (c).

6. A method according to claim 1 wherein the polyolefin is a homopolymer of ethylene.

7. A method according to claim 1 wherein the polyolefin is a copolymer of ethylene.

TABLE 1

Polymerization data

| Example | Reactor temperature in ° C. | Ethene concentration in % by volume | Hexene concentration in % by volume | Productivity in g of polymer/g of catalyst | Output in kg of polymer/h | Bulk density in g/l |
|---|---|---|---|---|---|---|
| 1 | 103 | 12 | 0.3 | 6250 | 6000 | 500 |
| 2 | 103.2 | 10 | 0.3 | 4800 | 5000 | 495 |

TABLE 2

Polymer and processing properties

| Example | HLMI in g/10 min | Mw in g/mol | Mw/Mn | Inner surface | Sag time in s | Melt strength in mN | Processing speed in m/min | Throughput in kg/h |
|---|---|---|---|---|---|---|---|---|
| 1 | 8.8 | 360900 | 14 | smooth, glossy | 95 | 0.5 | 25.9 | 145 |
| 2 | 6.4 | 375500 | 20 | rough, matt | 260 | 0.26 | 19.6 | 110 |

*At take-off speed of 0.26 m/s

We claim:

1. A method for producing a polyolefin pipe comprising:

preparing a polyolefin by polymerization in a single-line plant in the presence of a silica-xerogel-supported chromium catalyst activated with air and modified with an inorganic fluorinating agent,

8. A method according to claim 1 wherein the polyolefin is a copolymer of ethylene with a 1-alkene of 3 to 10 carbon atoms.

9. A method according to claim 3 wherein the crosslinking of said polyolefin is obtained by radiation crosslinking.

10. A method according to claim 5 wherein the polyolefin is a homopolymer of ethylene.

11. A method according to claim 5 wherein the polyolefin is a copolymer of ethylene.

12. A method according to claim 5 wherein the polyolefin is a copolymer of ethylene with a 1-alkene of 3 to 10 carbon atoms.

13. A method according to claim 3 wherein the crosslinking of said polyolefin is obtained by radiation crosslinking, and wherein the catalyst employed in the preparation of the polyolefin is prepared by a process which comprises:

a) providing a finely divided silica xerogel;

b) loading the xerogel with chromium from a solution of chromium trioxide or of a chromium compound; and c) activating the product obtained in stage (b) in an anhydrous gas stream, containing oxygen in a concentration of more than 10% by volume at from 400 to 1,100° C.; and wherein the chromium compound is converted into chromium trioxide under the conditions of stage (c); and wherein the modification of the catalyst with the fluorinating agent is conducted in stage (a), in stage (b), or in stage (c).

* * * * *